Figure 1:
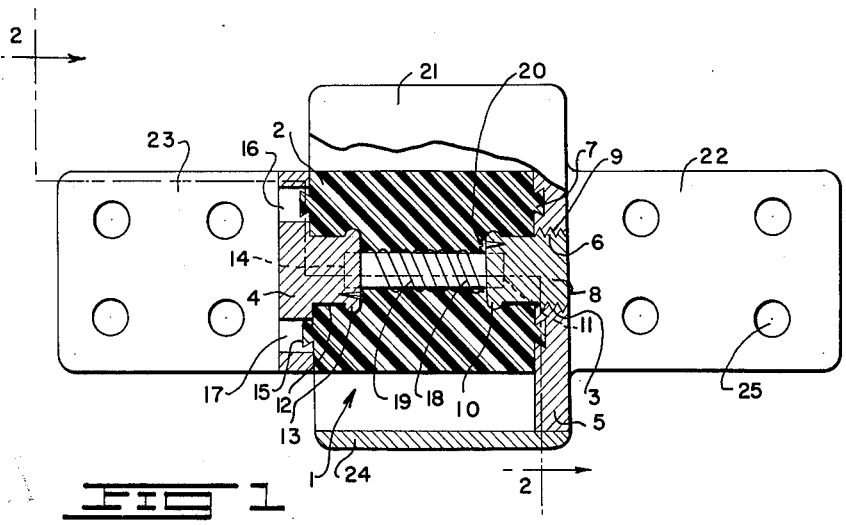

May 7, 1963   R. S. GENS ETAL   3,089,013
HIGH VOLTAGE EXPULSION LINK
Filed Oct. 18, 1960

INVENTORS
RALPH S. GENS
EDWARD H. GEHRIG

BY Ernest S. Cohen
   Gusten Sadowsky ATTORNEY

United States Patent Office 3,089,013
Patented May 7, 1963

3,089,013
HIGH VOLTAGE EXPULSION LINK
Ralph S. Gens, 7506 NE. Alameda, Portland, Oreg., and Edward H. Gehrig, 4850 SW. Upper Drive, Lake Grove, Oreg.
Filed Oct. 18, 1960, Ser. No. 63,453
4 Claims. (Cl. 200—131)
(Granted under Title 35, U.S. Code (1952), sec. 266)

The invention herein described and claimed may be manufactured and used by or for the Government of the United States of America for governmental purposes without the payment of royalties thereon or therefor.

The invention relates to improvements in circuit interrupters and particularly to devices for automatically isolating faulty electrical equipment from high voltage transmission lines and substations.

A failure of auxiliary equipment connected to transmission lines at remote points or in substation, such as apparatus supplying power to telemetering, measuring, and other indicating and control networks, can cause the opening of main power circuit breakers for the transmission lines and substation buses, interrupting the service provided thereby. Since restoration of service must then await the manual removal or replacement of the defective equipment by maintenance or operating personnel, lengthy and costly breaks in service result. This exigency can be avoided by instant and positive removal of the defective equipment from the circuit of the transmission lines to thereby permit the conventional circuit breakers in these lines and buses to reset and to restore general service from the network, almost immediately. Presently available devices operative in this manner to isolate the defective equipment, are complicated and relatively expensive. In many instances the equipment used such as high voltage automatic disconnect switches, cost more than the equipment to be isolated. However, the present invention is uniquely designed to be effective as an almost instantaneous disconnect means for the defective equipment, while attaining the benefits of simple construction and low cost.

Expulsion link type circuit interrupters according to the invention herein, provide an economical solution to the more critical design problems for equipment of this nature. The invention makes available a compact, easily assembled construction free from ionization deterioration at the highest industrial operating voltages, with increased mechanical strength so that supports are not required, and having an inertness to all weather and sunlight conditions. Essentially, these advantages are achieved by utilizing as the structural link between terminal pads, a cylindrical mold of insulating resin or elastomer within which is embedded a fuse core electrically joining the pads, and wherein the exposed surface of the molded form is nearly completely covered by a hoodlike cap.

It is an object of this invention therefore, to provide an improved electrical cutout device that shall be reliable in operation, and inexpensive to manufacture.

A further object of the invention is to provide in an improved circuit interrupting device a frangible, molded supporting connector between electrical terminal means, and an electro-responsive means within the connector, operable for fracturing the latter to thereby disconnect a circuit from a power source.

A still further object is a device to isolate defective auxiliary equipment from a power source connection to high voltage transmission line or substation buses, and having means integral therewith to eliminate external corona discharge into the air.

These and other objects of the invention will be more clearly understood from the following description of a preferred embodiment of the invention.

Figure 2:
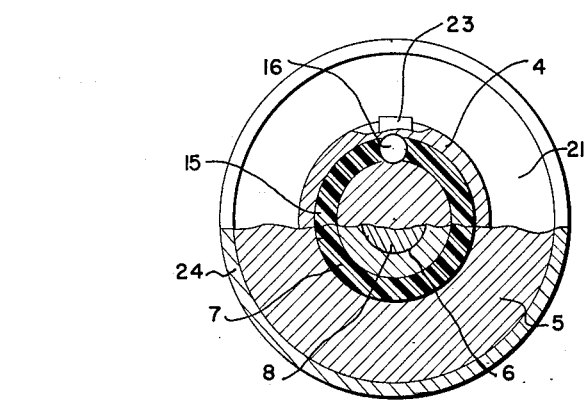

Referring to the drawing:
FIG. 1 is an elevational view partly in cross-section of the expulsion link according to the instant invention; and
FIG. 2 is a sectional view of the expulsion link shown in FIG. 1, on the line II—II of that figure.

The principal component of the improved high voltage expulsion link is a conglomerate structural arrangement 1, shown by a preferred embodiment in FIG. 1 as comprising a solid cylindrical casting 2 of epoxy resin, a cap disc assembly 3, and unitary base and support element 4, the latter two parts being made of aluminum or other similar electrically conductive material, and into which the opposite ends of the casting 2 are molded. Assembly 3 consists of two parts, one of which is a disc 5, having at its center a drilled and tapped hole 6, and cut into its inner side a circular dovetail groove 7, shown in FIG. 2 as spaced close by and concentric with the central opening 6. The other part of assembly 3 is a cylindrical seating support 8 having threads 9 along about half its curved surface starting from one end, and an integral flange portion 10, at its opposite end. A hole drilled into the center of flange 10, forms a socket or seat 11 for an element to be hereinafter described. Parts 5 and 8 are joined in the usual manner by screwing threads 9 into tapped hole 6. Formed integral at a central part of the inner side of base element 4, is a seating support 12, having a flange portion 13 in the center of which a drilled hole forms a seat 14 similar to seat 11. The inner side of base 4 is provided, as shown in FIG. 2, with a circular dovetail groove 15, concentric with the support 12, and having a diameter corresponding to that of the similar groove 7. Base 4 is also provided with two holes 16 and 17, drilled through at points defined by the intersection of a centerline on the circular base, and the groove 15.

The assembly 3, and base and support element 4 are spaced sufficiently apart to accommodate in their respective seats 11 and 14, the respective opposite ends of a rod 18, made of Lucite or other similar electrically insulating material. A fuse wire 19, of a selected rating is wound an appropriate number of turns around the rod 18, the respective ends of the wire being fastened to the flanges 10 and 13, by means of metal screws such as element 20. Exemplary of a fusing arrangement applicable in a cylindrical casting three inches in diameter, and three and half inches in length, is a five amperes fuse wire, wound eight turns per inch on a five-eighths inch diameter Lucite rod for a length of approximately two inches.

The fabrication of structural arrangement 1, is brought to completion by embedding all of its parts between the base 4 and disc 5, within the solid cylindrical casting 2, of epoxy resin. This is achieved by assembling the parts as previously described, and slipping a tubular mold form over the base 4, to seat upon the inner side of disc 5. The form is slightly tapered towards the base 4 to facilitate removal of the form from the solidified epoxy resin. With the mold form in place, the hollow chamber defined by the form, and the base and disc elements, is filled by pouring molten epoxy resin through one of the holes 16 or 17, until the resin is seen to fill both holes. It should be now evident that circular grooves 7 and 15 when filled with solidified epoxy resin of the internal mass of the casting, are effective to key together the base 4 and disc 5, and to thereby also secure within the casting the fusing arrangement including rod 18, and wire 19.

Exemplary of an epoxy casting material usable in the present invention, is a proportioned mixture including 340 grams of Shell Epon No. 828, 60 grams of Cardalite No. N. C. 513, and 45 grams of curing agent "D." Proper procedure for the casting requires that the inner sides of the disc and base be cleaned of oxide and dirt before setting the form for pouring, and that the poured form be cured in an oven at 150° F. for one and one-half hours.

Other insulating materials may be used to bind together the parts of the arrangement 1. While an epoxy resin has proved a highly effective material for this purpose, any of the polyester resins, or elastomers such as butyl rubber, would also be found suitable as insulating filler materials with which to embed the parts between base 4 and disc 5.

Subsidiary components of the expulsion link include a corona shell 21, and terminal pads 22 and 23. The shell 21 is made from a length of standard pipe 24 of aluminum or similar material, having an inside diameter corresponding to approximately that of disc 5, which is welded to the disc to form a unitary hoodlike cap or shell, surrounding an air space about the casting 2. Obviously, the structural portion constituted by shell 21, disc 5, and support 8, may also be produced as a one-piece casting instead of as an assembly of detail parts.

Terminal pads 22 and 23 are made from a relatively thick blank of aluminum or other similar electrical conducting material. The width of pad 23 is cut to approximate the diameter of base 4, and as indicated in FIG. 2, it is welded to the outer side of the base along the centerline defining the location of holes 16 and 17. Pad 22, is of a similar width, and is welded to the outer side of disc 5, in line with the pad 23. Connections from the expulsion link to the source via the high voltage transmission lines are made at terminal pad 22, and from the link to the equipment being protected at terminal pad 23. At the point of installation the pads are drilled for providing bolt holes such as element 25, to permit a convenient fitting of the expulsion link into the supporting structure.

Upon the occurrence of an overload, or fault current in the power circuit of the protected equipment, the fuse wire 19 will vaporize within the cylindrical epoxy casting 2. Thus is created an explosive pressure within the heart of the casting, and a resulting fracture of the epoxy cylinder. The mechanical and electrical integrity of the link being broken, the forces of the gases, and the pull of gravity will separate the terminal pads 22 and 23. Operation of conventional circuit breakers at the power source, will cause momentary de-energization of the supply circuit and will interrupt the current flow in the transmission lines and to the faulty equipment. However, since a sufficient air gap will be immediately attained between the equipment terminal pad 23, and the conductive elements 21, and 22, at the source end of the link, there would be a reset of the circuit breakers and an almost instantaneous restoration of service.

Epoxy resin as the structural bond between the terminal pads, provides the great mechanical strength needed in high voltage devices used on transmission lines where they are exposed to extreme conditions of temperature, wind and vibration. Nevertheless, the bond will fracture from internal pressure when called upon to do so. Also in the present invention the epoxy resin casting in conjunction with the corona shell provides a basically ionization-free performance and assures the absence of deteriorating effects caused by the corona produced at high voltages. As previously noted, a polyester resin, or a compound of an elastomer family would also satisfactorily provide the strength and toughness required for operation on high voltage transmission lines. When encountering short circuit or fault conditions, these materials would also be appropriately fractured by the internal pressures produced by the vaporizing fuse wire.

Primarily the corona shell 21, functions to eliminate ionization deterioration of the epoxy casting 2, as previously noted, and to prevent radio interference by eliminating external corona discharge into the air. However, by reason of its hoodlike shape being placed about the epoxy casting, it confines the shattering of epoxy when the expulsion link operates. Consequently, the shell 21 affords protection to personnel and equipment by preventing the violent scattering of fragments. Moreover, the design of the corona shell is such that it assists in the rapid separation of the conducting elements of the link, by confining release of the hot gases to a downward direction.

The invention may be adapted for use in many different mechanical and electrical environments. This may be done by varying one or more of its physical characteristics, such as the shape of the terminals, the dimensions and shape of the corona shell required to keep the equipment corona-free and suitable for use at the highest contemplated transmission voltages, the material and size of the fuse wire, the type of plastic used in the casting, and the shape of the seats supporting the insulating rod. Resins other than epoxy resin for the casting, or Lucite for the insulating rod may be employed. Moreover, the expulsion link of the present invention may be adapted for use with equipment using relatively large currents such as a power transformer, by merely providing it with fuse wire of suitable characteristics, in a manner well known in the art.

We claim:

1. A circuit interrupter expulsion link comprising a fuse wire wound around a rod of insulation material, a base element and a cover element each of electrically conductive material, and each having on its inner surface a means providing a socket, and a groove providing a keying surface, the respective ends of the rod being supported in the sockets and the respective ends of the fuse wire being electrically connected to the base and the cover elements, a solid mass of electrically insulating material which is a member of a class consisting of resins and elastomers, embedding all said parts between the inner sides of the base and cover elements, whereby the said grooves are filled with the insulating material to key together in a structural bond the said elements and all said parts therebetween 2. The expulsion link of claim 1, including a separate terminal means of conductive material connected respectively to the outer sides of the base and cover elements, and a shell of conductive material joined to one of the terminals, and substantially surrounding the outer surface of the solid mass of resin.

3. A circuit interrupter comprising a fuse element supported upon means of insulation material, a base element of conductive material having integral therewith a first means providing a socket, a second means providing a groove having a keying surface, and a third means providing conduit surfaces through the base element, a cover assembly of conductive material, including a cover element and a support element having a socket formed therein, said cover element having integral therewith a fourth means providing a groove having a keying surface, and a fifth means providing an opening in the cover element to receive in locking engagement the support element, said fuse element support means being seated in said first means and said socket of the support element and held in place between the base element and cover assembly thereby, said fuse element being conductively connected to the base element and the cover assembly, a solid mass of insulating material which is a member of a class consisting of resins and elastomers, embedding said first, second, third, and fourth means, said support element, and said fusing element and its means for support, whereby the said second and fourth means are filled with the insulating material to key together in a structural bond the said base element and cover assembly and all said means and elements therebetween.

4. The circuit interrupter of claim 3, including separate terminal means of conductive material connected respectively to the base element, and the cover assembly, and a shell of conductive material joined to the cover assembly, and substantially surrounding the outer surface of the solid mass of insulating material.

References Cited in the file of this patent
UNITED STATES PATENTS

| | | |
|---|---|---|
| 1,862,317 | Ringwald | June 7, 1932 |
| 2,249,012 | Leonard | July 15, 1941 |
| 2,302,820 | Van Liempt | Nov. 24, 1942 |
| 2,434,572 | Mankin | Jan. 13, 1948 |
| 2,830,156 | Burgess | Apr. 8, 1958 |
| 2,895,031 | Kozacka | July 14, 1959 |
| 2,961,515 | Sankey | Nov. 22, 1960 |
| 2,973,418 | Whitman | Feb. 28, 1961 |